Figure 1:
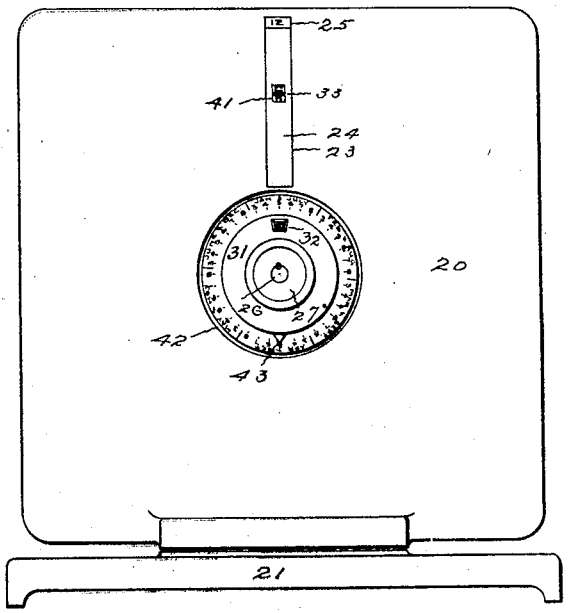

Dec. 16, 1924.

T. B. HARPER

APPARATUS FOR COMPUTING INTEREST

Filed April 9, 1923

1,519,253

4 Sheets-Sheet 1

INVENTOR.

Theodore B. Harper
by Harry P. Williams
atty.

Dec. 16, 1924.
T. B. HARPER
1,519,253
APPARATUS FOR COMPUTING INTEREST
Filed April 9, 1923
4 Sheets-Sheet 2
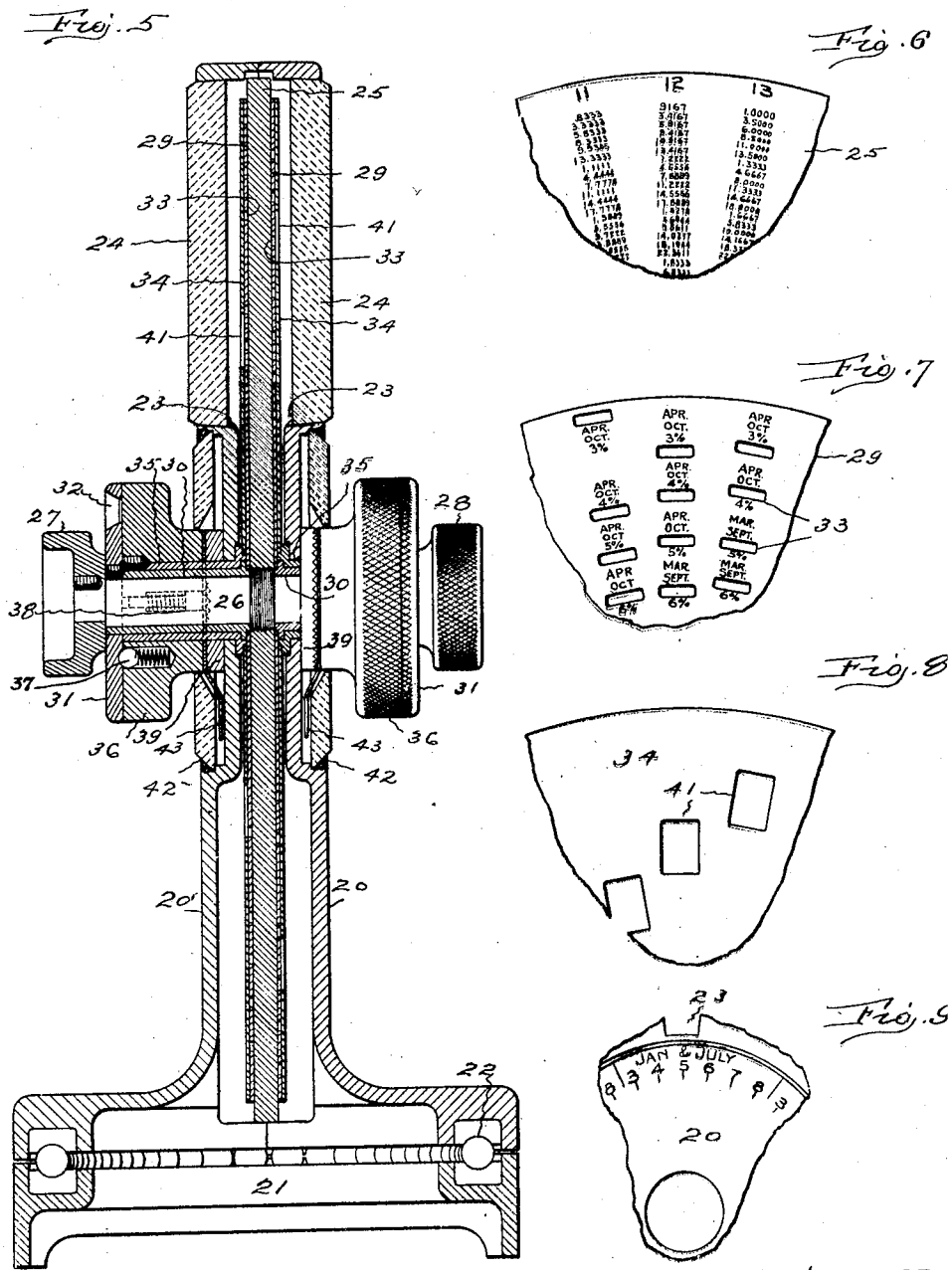
INVENTOR
Theodore B. Harper
Harry R. William Dec. 16, 1924.

T. B. HARPER 1,519,253

APPARATUS FOR COMPUTING INTEREST

Filed April 9, 1923 4 Sheets-Sheet 3

Dec. 16, 1924.

T. B. HARPER 1,519,253

APPARATUS FOR COMPUTING INTEREST

Filed April 9, 1923   4 Sheets-Sheet 4

INVENTOR
Theodore B. Harper
by Harry P. Williams
atty

Patented Dec. 16, 1924.

1,519,253

UNITED STATES PATENT OFFICE.

THEODORE B. HARPER, OF HARTFORD, CONNECTICUT.

APPARATUS FOR COMPUTING INTEREST.

Application filed April 9, 1923. Serial No. 630,720.

*To all whom it may concern:*

Be it known that I, THEODORE B. HARPER, a citizen of the United States, residing at Hartford, in the county of Hartford and State of Connecticut, have invented a new and useful Improvement in Apparatus for Computing Interest, of which the following is a specification.

Bankers, brokers, accountants, auditors, examiners and others handling large amounts of securities, such as bonds, debentures and notes, in the transaction of daily business are required to calculate the amount of interest due on the securities at different rates for various periods of time. Books and tables containing compilations at different rates for various periods have been prepared and are customarily used for this purpose. Owing to the large number of figures in these tables and the manner of reading them extreme care must be exercised to avoid error, and furthermore reading these figures is very tiresome to the eyes and brain of the accountant who has to make a large number of different calculations each day.

The object of this invention is to provide a simple mechanical apparatus particularly designed for such financiers, that is perpetual and can be quickly manipulated by anyone so as to show the exact amount or decimal thereof in dollars and cents, of interest at any of the usual rates for any lapsed time, which is due on the bonds, notes and similar commercial papers,—only the required figure and the significance thereof or confirmation of the desired result being visible after the correct adjustment has been effected.

This object is attained by combining a series of rotatable disks having calendar day and month notations, interest payment dates, interest rates, figures representing the amount of interest due at different rates for different periods, and windows, arranged in such manner that starting from any calendar date to which the apparatus may be set, on turning the handle to the appropriate rate of interest and due date, the windows will assume such positions that only the figure showing the amount due for the lapsed time between the paying date and the starting date, at the particular rate of interest, and the significance thereof, will be exposed to view at the front of the machine. These disks preferably also have figures representing the amounts due on Liberty and Treasury bonds and notes, which can be made to appear, by simply turning the handle pointer around directly to the notation of the particular bond it is required to ascertain the interest due thereon.

Figure 2:
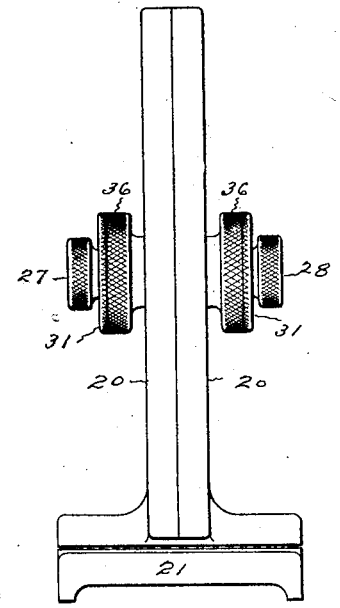
Figure 3:
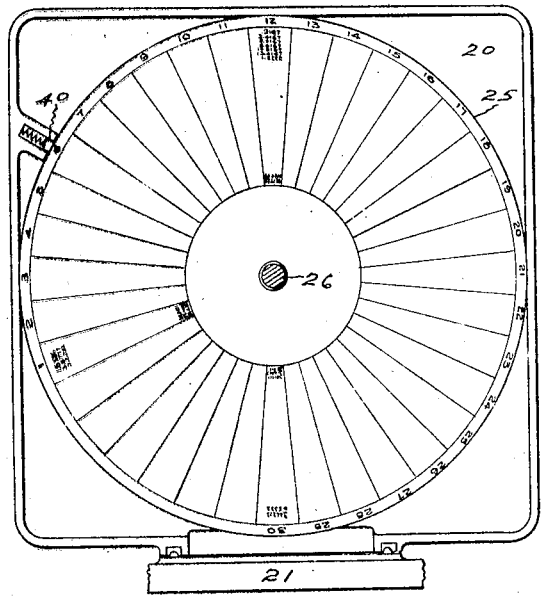
Figure 4:
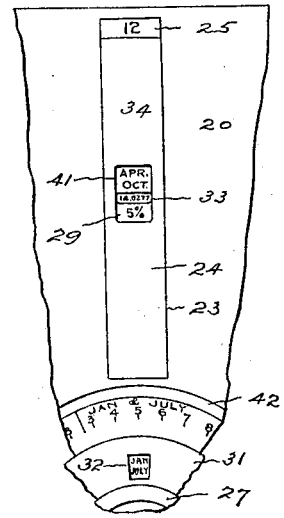
Figure 10:
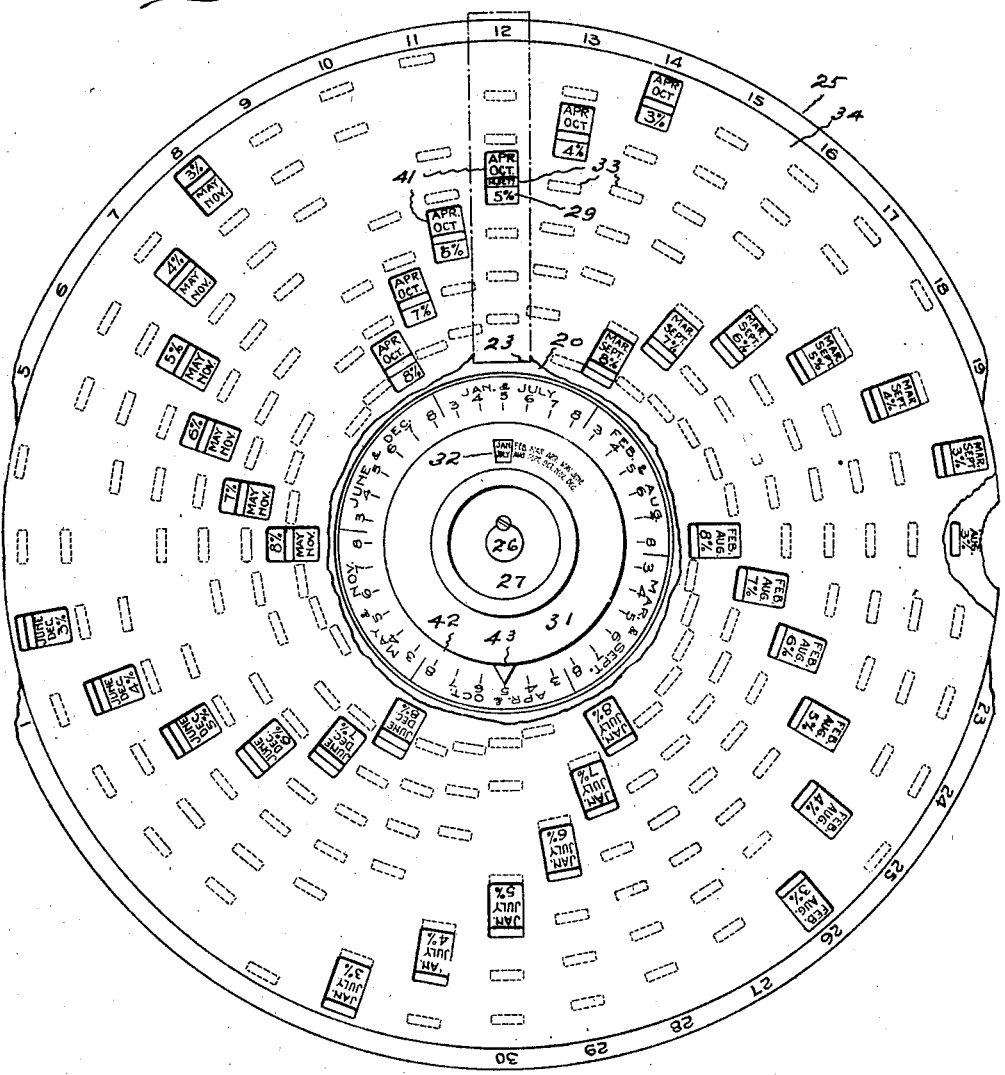
Figure 11:
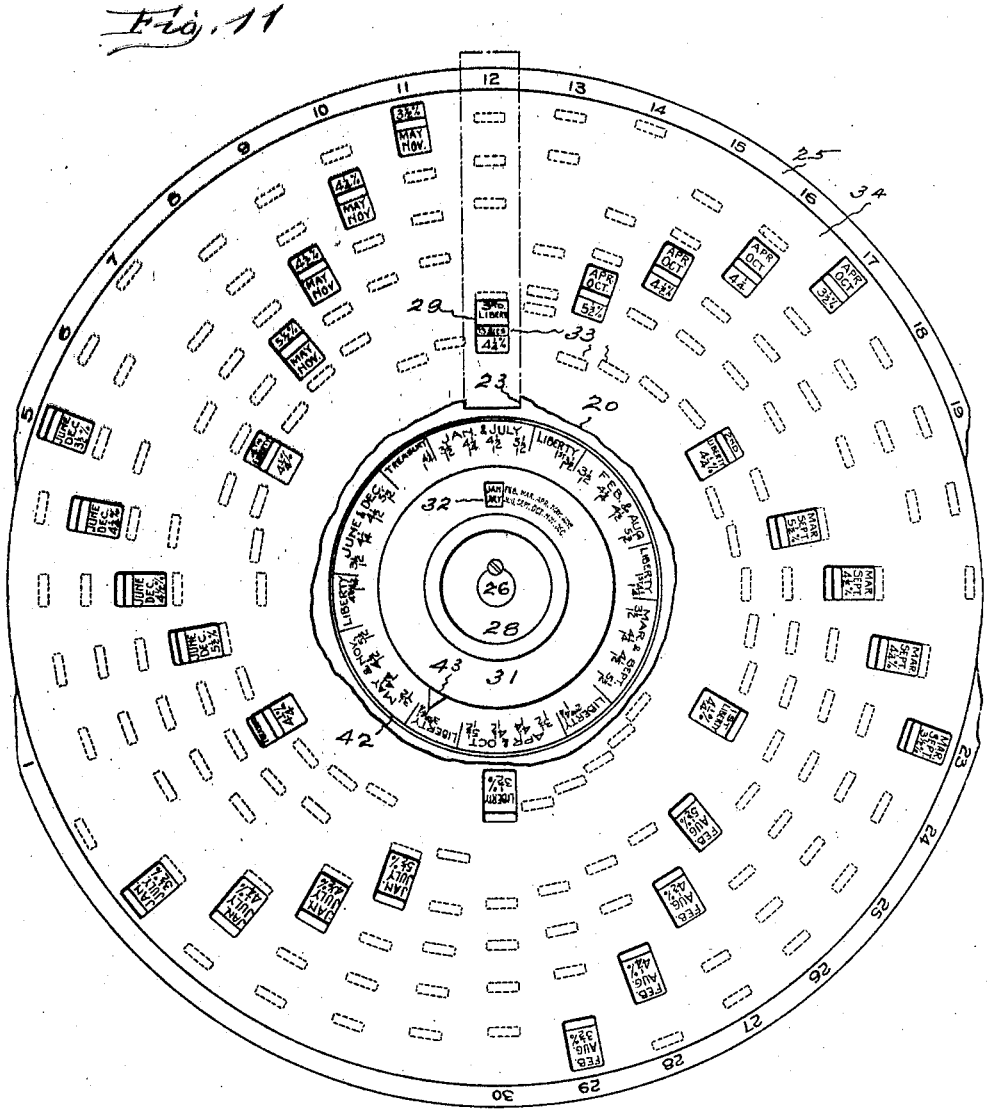

In the accompanying drawings Fig. 1 shows a front elevation of an apparatus which embodies the invention. Fig. 2 shows a side elevation of the apparatus. Fig. 3 shows a section of the casing and an elevation of one face of the main disk upon which the interest figures and days of the month are placed, only a few, however, of the numerals being depicted. Fig. 4 on larger scale shows a view of a portion of the casing and the window through which the reading is made. Fig. 5 is a central vertical section of the apparatus. Fig. 6 is a view of a portion of the main disk which carries the interest figures. Fig. 7 is a view of a portion of one of the intermediate disks which has small windows for exposing the interest numerals and which carries the significance of the figures. Fig. 8 is a view of a portion of one of the outer disks which has large windows for exposing the interest figures and significance thereof. Fig. 9 is a view of a portion of the casing, near the center, on which are the interest payment months and rates of interest. Fig. 10 is a view of the disks and operating knobs looking from one side. Fig. 11 is a view of the disks and knobs looking from the other side.

The disks which are manipulated to obtain the desired readings are enclosed in a casing 20 of suitable design mounted on a base 21. In order that the apparatus may be made compact and still contain the required figures of a size easily read, the disks and computations are preferably arranged so that the calculations at even rates of interest, as 3%, 4%, 5%, 6%, 7% and 8%, will be read from one side, and the odd rates, as 3½%, 4¼%, 4½% and 5½%, together with the interest due on the first, second, third and fourth 4¼% and first 3½% Liberty bonds and 4¼% Treasury bonds will be read from the other side. For convenience of handling the casing is pivoted to the base and anti-friction bearings 22 are interposed so that the casing may be quickly turned around to present either side to the front. In each face wall of the casing is a radially formed window 23 of a length and width sufficient to expose one column or row of radially arranged figures only, and in order to facilitate the reading of the numerals these windows are closed by a magnifying glass 24.

The main disk 25 is fastened in the casing to a rotatably mounted spindle 26 which on the outside of the casing at one end has a handle or turning knob 27 and at the other end a handle or turning knob 28. Fig. 5. On the faces of the main disk annularly arranged near the outer edge are figures representing the days of the month. These day numerals are located so that they will show, one at a time, at the top of the windows 23, as does 12 on Fig. 1. In the apparatus shown there are but thirty days represented, as that is the number of days per month commonly employed under stock exchange rules for figuring interest on bonds, etc.

Arranged in columns or radial rows on the faces of the main disk under each of the days of the month are interest due figures. Thus this main disk forms a shiftable indicia chart or table within the enclosing casing. Some of these are shown on Fig. 6 and the radial spaces for the same are indicated on Fig. 3. On one face of the main disk illustrated the outermost figures of the columns are the amounts of interest on $1000 at 3% for the number of days indicated for the columns, less one day, as in common banking practice there is no interest due on the first day of all obligations. The next inner figures of the columns are the amounts of interest at 3% for one month plus the days indicated for the columns. The third figures are the amounts of interest at 3% for two months plus the days indicated by the numbers at the heads of the columns. The fourth figures are the amounts of interest at 3% for three months plus the days indicated. The fifth set of figures are the amounts of interest at 3% for four months plus the days indicated. The sixth figures in from the periphery are the amounts of interest at 3% for five months plus the number of days indicated at the outer ends of the columns. The next sets of six figures in from the outer ends of the columns are the interest on $1000 at 4% for the different periods from one day to six months. The third sets of six figures of the columns are the sums at the rate of 5%. The next sets of six figures in from the periphery of the disk are the sums at the rate of 6%. The next sets of six figures are the sums at the rate of 7%, and the next or innermost set of six figures are the sums at 8%. In other words these figures represent the interest on $1000 at 3, 4, 5, 6, 7 and 8 per cent for all periods from one day to six months. Six months is the limit used on the apparatus shown, as the interest on bonds and similar commercial papers is commonly payable semi-annually. On the other face of the disk are figures representing the amounts of interest for the rates of 3½%, 4¼%, 4½% and 5½% from one day to six months and the interest on Liberty bonds. Any one of these radial columns of interest figures may be brought up back of the magnifying window glasses 24 by turning the knobs 27 or 28.

The intermediate disks or shutters 29 which stand against and cover the faces of the main disk except those portions near the periphery bearing the day numbers at the heads of the columns of interest figures, are fastened to sleeves 30 that are rotatably fitted upon the spindle 26. Fastened to the outer ends of these sleeves are circular plates 31 which have small windows 32. Fig. 5. The intermediate disk or shutter on the even interest side of the device shown has two hundred and sixteen windows 33 each of a length and width that will expose one only of the interest figures on the main disk. These windows are located on different radii and varying distances from the center.

There are six groups of these windows 33 and each group has thirty-six windows. The windows of one group are lettered January and July, the next February and August, the next March and September, the next April and October, the next May and November and the last June and December. The windows of each group of thirty-six are arranged annularly in stepped series of six. The outer series of each six are lettered 3%, as they are so arranged and stepped that the six numbers of the 3% interest figures in the several columns on the main disk will be successively exposed when the intermediate disk or shutter is turned clockwise with relation to the main indicia dial or disk. The next inner series of six windows are lettered 4%, as they expose successively the six 4% interest figures. The next series of six windows are lettered 6%, the next 7% and the innermost 8%. Fig. 10. By properly turning this intermediate shutter or disk any one of the interest amounts on the main indicia disk may be exposed back of the magnifying window in the casing, all of the other figures being concealed.

The outer shutters or disks 34 which lie over the intermediate disks are fastened to sleeves 35 rotatably fitted upon the sleeves 30. Attached to the outer ends of these sleeves 35 are knobs 36. Fig. 5. The annular plates 31 that are attached to the sleeves 30 and that have the windows 32, cover the faces of the knobs 36, and on the faces of the knobs back of the windows 32 in the circular plates are the designations January and July, February and August, March and September, April and October, May and November, June and December. Fig. 10. Spring ball-detents 37 are arranged in the knobs so as to engage the plates and normally retain the knobs and plates in relatively fixed relation, but permit the knobs to be turned independently to bring the different monthly letterings back of the windows 32. In the apparatus illustrated the relations of the plates and knobs are changed but once a month, the parts being set on the first of each month so as to expose the present month lettering through the windows 32.

The knobs 36 are also provided with spring plungers 38 which press against serrated faces of collars 39. Fig. 5. These plungers prevent displacement of the knobs 36 when the knobs 27 and 28 are turned, but allow the knobs to be turned when it is desired to turn the intermediate and outer disks. The main disk 25 which is turned by the knobs 27 and 28, once a day, is held from displacement when the outer disks are turned, by a ball-detent 40 arranged in the casing so as to engage the periphery of the main disk. Fig. 3. The outer disk 34 on the even interest side has thirty-six windows 41 arranged in stepped series of six each. Fig. 10. Each of these windows is of a size that will permit the exposure of six of the interest figures in the radial columns on the main disk or exposure of the windows in the intermediate disks in six different radial positions. The outermost windows of the series are located so as to expose the 3% interest figures for the periods of January and July, February and August, March and September, April and October, May and November, and June and December. The next inner windows are arranged to expose the 4% interest figures for the several six month periods. The next will expose the 5%, the next the 6%, the next the 7% and the innermost the 8% interest figures for the six month terms. Fig. 10.

The number of windows in the disks may be varied according to the computations that the device is designed to make, in fact in the arrangement illustrated the disks on the Liberty bond side have fewer windows than the disks on the even interest side.

Annularly arranged on the casing about the operating knobs back of the windows 42 (Figs. 1 and 5) are graduations representing the various interest rates for each of the six month periods, on one side of the casing the rates noted being for 3, 4, 5, 6, 7 and 8 per cent interest and on the other side the rates being for 3½%, 4¼%, 4½% and 5½% interest and also notations for Liberty bonds. Attached to the knobs 36 are pointers 43. Figs. 5 and 10. Notations for other classes of bonds may be used in place of the Liberty bond notations, if desired.

In using this apparatus the knobs 36 and circular plates 31 are adjusted with relation to each other so that the present month notations on the faces of the knobs will show through the windows 32 in the plates. This adjustment is normally made once a month. In the drawings the apparatus is shown as set for the months January and July. The main disk is adjusted, the other disks remaining stationary, until the particular day of the present calendar month appears at the top of the radial window 23 in the casing. This latter setting is normally made each day. The drawing shows the disk set for the twelfth day of the month. Thus the apparatus is illustrated as set for the twelfth day of January or the twelfth day of July. With the device set for the day of use all that it is necessary to do to find the amount of interest due on bonds or other papers on that day is to turn the knob 36 until the pointer attached to the knob points to the rate of interest of the bonds on the section on the casing which is lettered for the months in which the interest is paid on the bonds. When thus turned the amount of interest desired to ascertain shows up through the windows, and that amount only. In the drawings the pointer is shown as pointing to 5% payable April and October. Setting the plates with relation to the knobs for the present month and day brings the small windows in the intermediate disks and the large windows in the outer disks in such relation that when the knobs are turned to any interest rate for any payment date the only figure which will be exposed through the casing will be that which shows the amount of interest on a thousand dollars due at the particular rate from the payment date to the present day. In the drawings (Figs. 1 and 10) the apparatus is set for the twelfth day of January and July and the calculation assumed is for a 5%, $1000 bond, with coupons payable April and October. With this setting the windows are in such relation that they show only the figures 14.0277, the interest due on $1000 at 5% on January 12th from October 1st or July 12th from April 1st, as the case may be. As previously stated in order to ensure compactness in the apparatus the calculations are for six months rather than a year, as bonds and similar papers are ordinarily payable semi-annually.

On the opposite side of the main disk from that above described, and shown in Fig. 11 are the amounts for the odd rates of interest and also the interest amounts on Liberty bonds. On this side the apparatus is illustrated as set for showing the amount of interest on January or July 12th on the third Liberty loan 4¼% bonds which amount is 13.8125. The invention is not limited to an apparatus with the interest amounts readable on both faces for the figures and shutter disks can be arranged on either or both sides of the main disk, as readily understood by those skilled in this art.

By setting this apparatus on the first day of each month for the present month and on each day for the present day, the interest on any $1000 bond may be instantly obtained by simply turning the operating knob until the pointer points to the rate of interest in the period of payment date of the bond, and only the exact amount of interest will be exposed to view, all of the other figures being concealed by the disks and casing. With this instrument discounts as well as bond interests are capable of being computed and shown by simply manipulating the knobs and causing the disks to assume such relation that only the amount of interest at the rate and for the period under consideration will be exposed through the casing.

The invention claimed is:—

1. An apparatus for calculating accrued interest on bonds comprising a casing having a vision window therein, a calculating table having accrued interest calculations thereon, a disk having windows therein of smaller dimension than the vision window in the casing, a second disk having windows therein of smaller dimension than the windows in said first disk, means for setting said disks relatively for determining the accrued interest at a given month, means for shifting the calculating table for positioning the accrued interest amount for a given day in said month, and means for shifting the disks having windows therein and relative to the vision window for exposing the calculated interest on a bond of a given rate and payable on a given day.

2. In a calculating apparatus, a casing having a vision window therein, a calculating table in said casing, a shutter in said casing having a series of windows therein adapted to register with the vision window in the casing, a second shutter in said casing having a series of windows therein adapted to register with the windows in said first shutter, means for shifting said shutters to register certain of the openings therein to permit the view therethrough of desired indicia on said calculating table, and means for shifting said calculating table to register certain indicia thereon with the vision window in said casing.

3. A calculating device comprising an enclosing casing, provided with an indicia viewing window, an indicia chart mounted therein and having columnar calculations, means for shifting said chart to move an entire column into registry with said window, a first shutter in said casing arranged in front of said chart, said shutter having a series of windows therein, each of sufficient size to display aggroupments of said calculations, means to shift said shutter to register a desired first shutter window with said casing window to select a desired aggroupment for observation, a second shutter in said casing interposed between said first shutter and said chart, said second shutter having a series of windows therein of sufficient size to display single calculations of an aggroupment, and means to shift said second shutter to register a selected window thereof with the first shutter window and casing window whereby to display a desired single calculation.

4. A device for calculating accrued interest on bonds and, the like comprising an enclosing casing provided with an indicia viewing window, a calculating table mounted in said casing and provided with calculating indicia adapted to be viewed through said window, means to shift said table to register desired calculations with said window, a plurality of overlying shutters arranged in said casing between said window and said table to shield said table from view, each of said shutters having a plurality of windows therein constructed and arranged to register with each other on movement of said shutters into different positions to present a desired single calculation.

5. A device for calculating interest comprising a chart having arranged thereon columns of interest calculations, the corresponding calculations of each column differing by increments equal to one day's interest, and each column including groups of calculations of variant interest rates, the successive calculations of each group differing in increments corresponding to a month's interest of such rate, a casing enclosing said chart and provided with an indicia window of sufficient dimensions to permit the display of an entire single column of calculations, means for permitting the display of a selected group of a selected column, means for permitting the display of a selected single calculation of such selected group, and means for bringing a desired column before said window.

6. A device for calculating interest comprising a chart having arranged thereon columns of interest calculations, the successive calculations differing by a predetermined increment and each column including groups of correlated calculations, the successive calculations of which differ by predetermined increments, a casing enclosing said chart and provided with an indicia window of sufficient dimensions to display an entire single column, means for shiftably mounting said chart in said casing to bring a desired column of calculations before said window, means for restricting the display of said column to a selected group, and means for restricting the display of said group to a desired single calculation.

7. A device for calculating interest comprising a dial having radially arranged columns of interest calculations, the differential increment between the corresponding calculations in successive columns being the equivalent of one day's accrued interest, said dial having a series of day designating numbers disposed at the marginal head of each of said columns, a casing enclosing said dial and provided with an indicia window of sufficient length and width to display an entire single radial column of calculations plus the marginal number therefor, means for shiftingly mounting said dial in said casing to bring a desired column of calculations before said window, and means interposed between said dial and said window for permitting the display of the marginal number and a selected single calculation of the radial column registering with said window.

8. A device for calculating accrued interest on bonds and the like comprising an enclosing casing having an elongated indicia window, a dial rotatably mounted therein and provided with radial columns of interest calculations each of a length co-extensive with said window, means for shifting said dial to bring a selected column in register with said window, a first shutter in said casing between said dial and window and provided with radially arranged windows each of a dimension one thirty-sixth of the length of said casing window, a second shutter disposed between said first shutter and said casing window and provided with a series of windows each of a length equaling one-sixth of the length of said casing window, and means to shift said first and second shutters to register predetermined windows therein with said casing window.

9. A device for calculating accrued interest on bonds and the like comprising an enclosing casing having an elongated indicia window, a dial rotatably mounted therein and provided with radial columns of interest calculations each of a length co-extensive with said window, means for shifting said dial to bring a selected column in register with said window, a first shutter in said casing between said dial and window and provided with radially arranged windows each of a dimension one thirty-sixth of the length of said casing window, a second shutter disposed between said first shutter and said casing window and provided with a series of windows each of a length equaling one-sixth of the length of said casing window, means to shift said shutters together to register certain windows therein with said casing window, and means for permitting the relative shifting of said shutters to register other windows in said shutters with each other and with said casing window.

10. A device for calculating accrued interest on bonds and the like comprising an enclosing casing having an elongated indicia window, a dial rotatably mounted therein and provided with radial columns of interest calculations, each of a length co-extensive with said window, means for shifting said dial to bring a selected column in register with said window, a first shutter in said casing between said dial and window and provided with radially arranged windows each of a dimension one thirty-sixth of the length of said casing window, a second shutter disposed between said first shutter and second casing window and provided with a series of windows each of a length equally one-sixth of the length of said casing window, and means to shift said first and second shutters to register predetermined windows therein with said casing window.

11. A device for calculating interest comprising an enclosing casing having a vision window, a chart shiftably mounted in said casing and provided with interest calculations thereon arranged in aggroupments corresponding to differentials in daily and also monthly increments of variant rates of interest, a plurality of shiftable shutters in said casing interposed between said chart and vision window and provided with windows therein constructed and arranged to permit the presentation before said vision window of a single calculation at a time corresponding to the accrued interest on a predetermined amount at a desired rate and for a desired number of months and days thereof.

12. A device for calculating accrued interest on bonds and the like comprising an enclosing casing having an elongated indicia window, a spindle arranged on said casing and having its axis arranged in line with said window, a dial rotatably mounted on said spindle within said casing, said dial having a plurality of columnar calculations radiating from said spindle, each of said columns being of a length co-extensive with said window, a turning knob on said spindle for turning said dial, a plurality of shutters fixedly mounted on said spindle within said casing and disposed in overlying relation between said dial and said casing window, turning knobs on said spindle each connected to a shutter whereby on rotation of said knobs said shutters are shifted angularly, means insuring the simultaneous shifting of said shutter knobs, said means being constructed and arranged to permit said knobs to be shifted relatively.

13. A device for calculating interest comprising a casing having a central spindle and an elongated window arranged in the line of axis of said spindle, a dial carried by said spindle within said casing and provided with radially arranged columns of interest calculations, a turning knob on said spindle for turning said dial angularly and provided with radially arranged indicia thereon to indicate the angular adjustment of said dial, two shutters disposed on said spindle within said casing, said shutters having radially arranged windows therein adapted to register with each other and with said casing window, two turning knobs on said spindle outside of said casing, means connecting each knob with a shutter for turning said shutters, an indicating dial arranged on the outside of said casing and connected with one of said knobs, said dial having indicia thereon arranged radially of said spindle, indicia arranged radially on one of said shutter knobs and a cooperative index on the other shutter knob, means compelling both shutter knobs to turn together, said means being constructed and arranged to permit the relative adjustment of said shutter knobs in accordance with the indicia and index thereon.

14. A device for calculating accrued interest on bonds and the like comprising an enclosing casing provided with an elongated indicia viewing window, a dial rotatably mounted in said casing and provided with radially arranged columns of predetermined interest calculations, means for shifting said dial to bring any single radial column into registry with the indicia window, a first shutter dial disposed in said casing between said indicating dial and said indicia window, said first shutter dial being formed with radially disposed windows therein, a second shutter dial in said casing between said first shutter dial and said indicia window, said second shutter dial having a plurality of radially arranged windows therein, and means for shifting said dials together and also relatively in order to bring variant combinations of said windows into registry with the casing window and with the calculations on said indicia dial.

15. A device for calculating accrued interest on bonds comprising an enclosing casing provided with an elongated indicia window, a turning spindle on said casing having its axis in line with said window, an indicia dial on said spindle and within said casing, said dial having radially arranged columns of interest calculations thereon, each of said columns being adapted to be brought into registry with said window on the turning of said spindle, a first shutter dial on said spindle in the casing between said indicia dial and the casing window, a second shutter dial on said spindle in said casing between said first shutter dial and said casing window, an index dial on the front of said casing concentrically surrounding said spindle and provided with a rigid connection with said second shutter dial, a turning knob concentrically surrounding said spindle and on the front of said casing, and rigidly connected to said index dial, a second turning knob on said spindle contiguous to said first turning knob, said second turning knob being rigidly connected with said first shutter within the casing, means for insuring the simultaneous rotation of said first and second turning knobs, said means being constructed and arranged to permit said knobs to turn relatively, said first shutter dial having a plurality of radially arranged columns of windows therein disposed in groups angularly about the axis of said shutter dial, the windows of each of said groups representing predetermined divisions of a year, said indexing dial having corresponding radially arranged indicia thereon, said second shutter dial having radially arranged windows disposed in substantially spira-form groups angularly about the shutter dial.

16. In a calculating apparatus, a casing having a vision window therein, a calculating table in said casing, a shutter in said casing having a series of windows therein adapted to register with the vision window in the casing, a second shutter in said casing having a series of windows therein adapted to register with the windows in said first shutter, means constructed and arranged to permit said shutters to be shifted relatively and also together with respect to said vision window to permit view of desired calculating indicia on said table, and means for shifting said table to register desired indicia thereon with said vision window.

THEODORE B. HARPER.